United States Patent [19]

Reinen

[11] Patent Number: 4,669,235
[45] Date of Patent: Jun. 2, 1987

[54] SPACING AND SUPPORT CONSTRUCTION MEMBER

[76] Inventor: Richard E. Reinen, 1725 Highway 20 NW., Toledo, Oreg. 97391

[21] Appl. No.: 915,412

[22] Filed: Oct. 6, 1986

[51] Int. Cl.$^4$ ............................................. E04B 7/02
[52] U.S. Cl. ......................................... 52/98; 52/105; 52/92; 52/714; 52/370; 411/461; 411/466; 403/403
[58] Field of Search ....................... 52/98, 105, 90, 92, 52/714, 735, 370; 411/461, 457, 466; 403/403

[56] References Cited

U.S. PATENT DOCUMENTS

| | | | |
|---|---|---|---|
| 2,024,312 | 12/1935 | Trachtenberg | 52/105 |
| 2,302,194 | 11/1942 | Dayton | 403/403 |
| 2,964,807 | 7/1957 | Kennedy | 52/696 |
| 4,080,771 | 3/1978 | Weller | 52/105 |
| 4,246,736 | 1/1981 | Kovar et al. | 52/696 |
| 4,410,294 | 10/1983 | Gilb | 403/403 |
| 4,488,385 | 12/1984 | Teasel | 52/92 |
| 4,617,770 | 10/1986 | Hickman | 403/403 |

Primary Examiner—Henry E. Raduazo
Attorney, Agent, or Firm—John F. Ingman

[57] ABSTRACT

A spacing and support construction member for wood frame construction which provides precise positioning and support for cross-members, such as joists and rafters, on their supporting members, and, in addition, provides for pre-nailing positioning of blocking pieces between cross-members, and furnishes supplementary vertical connection and support, the latter having special use in the attachment of rafters. The construction member comprises a center strip, laid longitudinally along support members, from which transversely-oriented perpendicular projections extend to position the cross-members for attachment. Additional projections provide supplementary horizontal, or, when bent about the edge of the supporting member, vertical attachment means for the construction member, permitting direct vertical connection between the cross-member and its supporting member. The projections from the center strip additionally provide edges for the positioning of blocking pieces between the cross-members for attachment. Placement notches on the center strip facilitate positioning the strip on the supporting member so that the blocking pieces will be aligned with a side surface of the supporting member. A starter and terminal strip, compatible with the spacing and support construction member, is provided to position and support the first and last cross-members of a run thereof.

6 Claims, 7 Drawing Figures

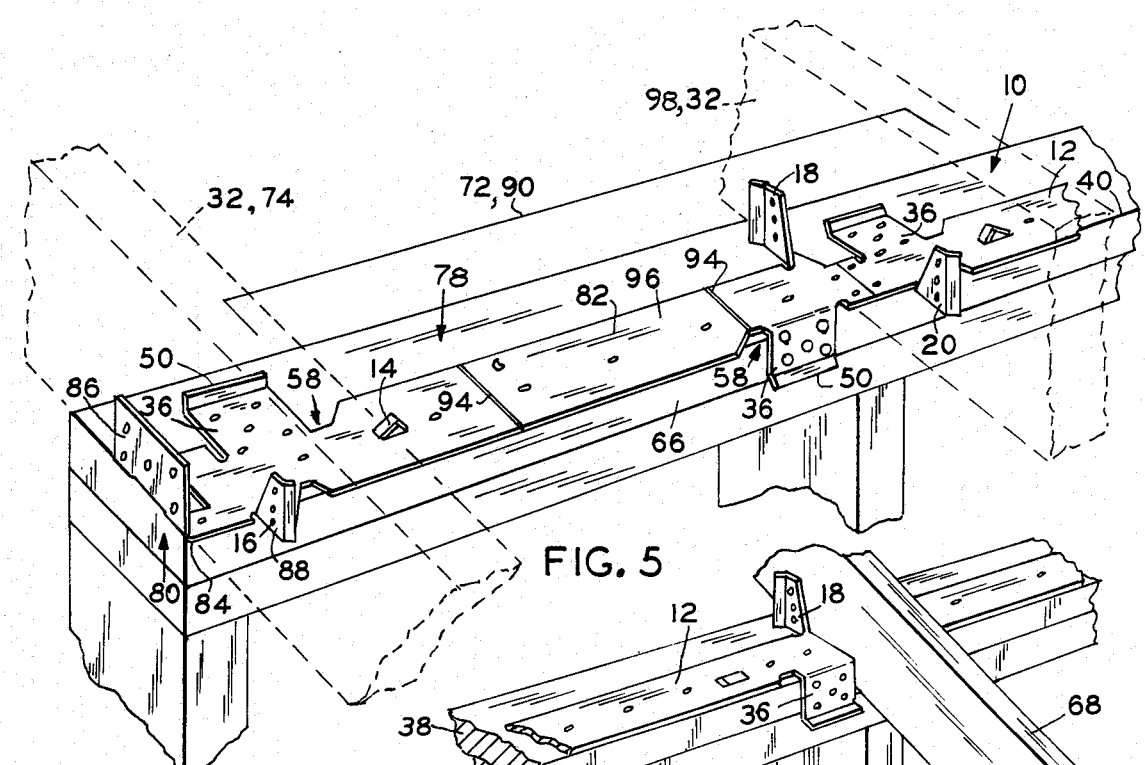
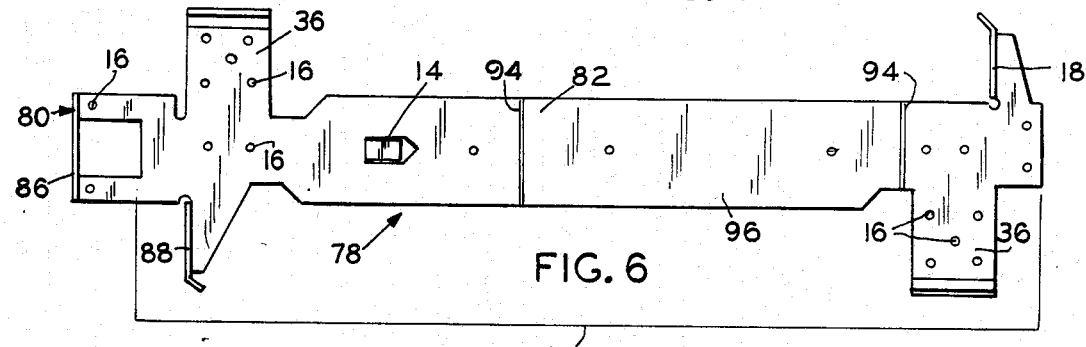
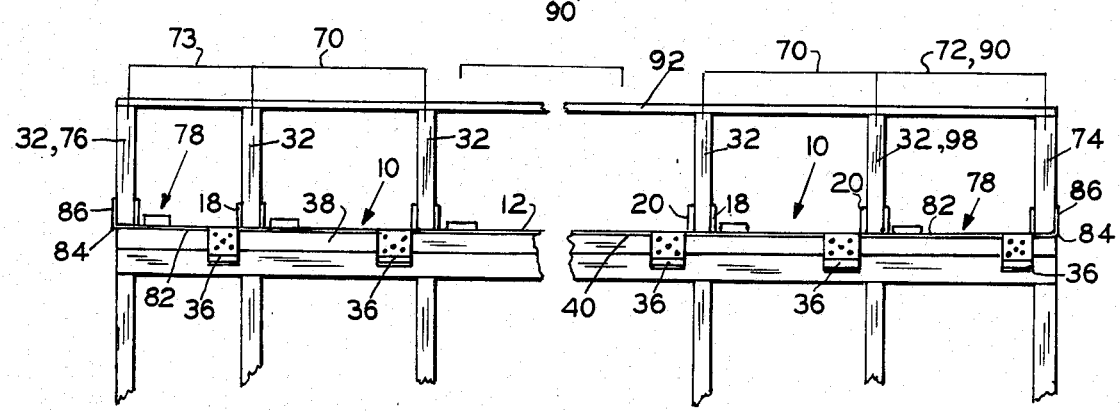

SPACING AND SUPPORT CONSTRUCTION MEMBER

BACKGROUND OF THE INVENTION

1. Field of the Invention

The present invention generally relates to spacing and support construction members used in the construction of wood frame dwellings and other buildings, and, more particularly, is concerned with an spacing and support construction member which provides not only precise positioning and support for cross-members, such as joists and rafters, but, in addition, provides for pre-nailing positioning of blocking pieces between cross-members, and furnishes supplementary vertical connection and support, the latter being especially useful in the attachment of rafters to their supporting members.

2. Description of the Prior Art

In the construction of a building, it is important to precisely locate various materials prior to their attachment. This is particularly important with multiple cross-members, such as joists and rafters, where precise location is necessary to permit effective attachment of pre-sized sheets of flooring or roofing to the cross-members. In the past, the location for the cross-members commonly has been identified by measuring with a tape or rule, and marking the location by pencil. As successive locations were established, errors tended to be cumulative; even the thickness of a dull pencil lead could lead to significant error in a long run of joists or rafters. In addition, once carefully positioned at the appropriate pencil mark, the cross-member generally would not remain by itself in the proper position or alignment during the process of attaching it to the supporting member, so that repositioning and realignment was generally necessary.

A need therefore exists for a spacing and support construction member for the exact placement and retention, pending attachment, of multiple cross-members, such as joists and rafters. Such spacing and support construction member should physically position the cross-members with relation to the supporting member to which they are to be attached without the need to resort to measurement of position, and should hold the cross-members in the correct position and alignment for conventional structural attachment, such as nailing.

In addition to proper spacing, the spacing and support construction member should also provide support to the cross-members through physical linkage of the spacing and support construction memher to both the cross-members and the supporting members, forming a structural bridge therebetween. Such structural connection is of substantial importance in the joining of rafters to their supporting members, where there is a requirement for enhanced vertical structural attachment so as to preclude disconnection of a roof in severe weather conditions.

In addition, in the attachment of blocking pieces between cross-members, particularly at the end thereof so as to provide an even outside surface for the application of siding, it has proven difficult for the carpenter to achieve the desired alignment of the blocking. The problem is two-fold: first, if the spacing between the cross-members is not consistently precise, each blocking piece must be cut individually to fit the available space, and second, once placed into the space between the cross-members and on top of the supporting member, it is difficult to keep the blocks vertical for attachment. Driving a nail through the lower portion of the blocking piece into a cross-member or the supporting member tends to pivot that lower portion of the block in the direction of the hammer blows so that it departs from the proper position where it is vertical or flush with the edge of the supporting member.

As noted above, there is also a structural requirement in the attachment of cross-members, particularly rafters, to their supporting members to enhance the strength of that attachment in the vertical direction. This is currently provided by so-called "hurricane clips" which are twisted metal construction members, attached vertically between each rafter and its supporting member with the attaching nails penetrating both rafter and supporting member horizontally for maximum vertical strength. The application of hurricane clips could be more efficiently accomplished by the use of an already present construction member which would provide equivalent attachment and support for the rafters.

Finally, to achieve maximum utilization within the construction industry, any such spacing and support construction member should be lightweight, inexpensive, readily stackable, and easy to handle and work with.

SUMMARY OF THE INVENTION

The present invention provides a spacing and support construction member for cross-members which is designed to satisfy the aforementioned needs. The invention comprises an elongated center-strip configuration, with perpendicular projections, between which the cross-members are placed for positioning for structural attachment and with additional projections, coplanar with the center strip, for use as horizontal or vertical nailing tabs, and which, in combination with the perpendicular projections, also permits quick and easy positioning of blocking pieces.

Accordingly, the spacing and support construction member provides a center strip which is attached lengthwise, generally by self-nailing prongs or by nailing through perforations provided therein, to a supporting member, such as a top plate for joists, and a top plate and ridge beam for rafters. The center strip embodies sets of perpendicular projection pairs which extend from the center strip; the parallel planes of each pair of perpendicular projections being oriented transversely to the longitudinal axis of the center strip and being spaced from each other by the thickness of the cross-member. The pairs of perpendicular projections are precisely located along the center strip so as to provide exact location for each of a number of cross-members with respect to the center strip, and thus to other cross-members and to the supporting member to which the spacing and support construction member is attached; the perpendicular projections themselves holding the cross-member in desired perpendicular orientation to the supporting member, pending the nailing of the cross-member to the supporting member as desired.

In addition to the aforementioned perpendicular projections, additional projections, initially coplanar with the center strip, extend from the center strip for use as nailing tabs, these projections having perforations for that purpose. The nailing tabs may be nailed to the supporting member while the tabs are in their original coplanar position; or as designed, nailing tabs may be bent about the edge of a supporting member at right angles to the plane of the center strip so as to extend along what is normally a vertical surface of the supporting member. Thus, the spacing and support construction member itself provides continuous attachment and support between between cross-members and their supporting members, and also may provide needed supplemental vertical support between the cross member and the supporting member, such vertical support being especially important in restraining rafters in severe weather where winds might vertically separate a roof from the remainder of the structure.

The spacing and support construction member also is designed so that a combination of the aforementioned projections (a perpendicular projection and a nailing tab) are available for the positioning of blocking pieces between cross-members. When used for blocking, in the position for each blocking piece, a perpendicular projection and a nailing tab extend equidistantly from the center strip. The edges of these projections provide a fixed position against which the blocking piece may be quickly and firmly located for nailing without subsequent pivoting movement due to the forces of the nailing. Such projections, at their outer edges against which the blocking is positioned, may have such edges angled so as to provide greater edge prominence. The positioning edges may be placed at a location equal to the blocking piece's thickness from the edge of the supporting member to which the center strip is lengthwise attached, thereby enabling the blocking piece to be readily aligned flush with the edge of the supporting member to provide a smooth exterior for the application of siding. To facilitate such location of the positioning edges, the center strip may be notched on the opposite side of the center strip to provide a positioning guide for initial placement of the center strip on the supporting member so as to achieve the desired blocking piece positions. In the use of such positioning guide notches, the base of the notches are aligned even with the opposing edge of the support member. Since the positioning edges are available on both sides of the center strip, the placement notches are also found on both sides of the center strip.

The spacing and support construction member is continuous, but designed to be severable at the center of each cross-member location, that is, between each pair of perpendicular projections, so that unneeded sections of the center strip can be removed and the length of the center strip thus shortened; or the center strip may be lengthened by abutting two strips together at a cross-member location. A starter and terminal segment compatible with the spacing and support construction member is provided for use as either a starting segment or a terminal segment. The starting segment, involving only the initial two cross-members, is characterized by perpendicular projections on both sides of the first cross-member, and a shorter center strip length to permit the laying of standard sheet material to the outside edge of the first cross-member. When used as a terminal segment, the segment center strip is breakable at a plurality of locations so as to be suitably shortenable when the spacing between the next-to-last cross-member and the last cross-member is less than the standard separation in that construction.

The spacing and support construction member is designed to be formed economically of lightweight material, and to be readily stackable for ease of handling and storage.

BRIEF DESCRIPTION OF THE DRAWINGS

FIG. 4 illustrates the use of the spacing and support construction member where the cross-members are rafters.

FIG. 5 illustrates a perspective view of a starter and terminal segment of the spacing and support construction member.

FIG. 6 illustrates a top view of the starter and terminal segment of FIG. 5.

FIG. 7 provides an elevation view illustrating use of the starter and terminal segment in conjunction with the spacing and support construction member in a upper level joist and flooring application.

DESCRIPTION OF THE PREFERRED EMBODIMENT

Figure 1:
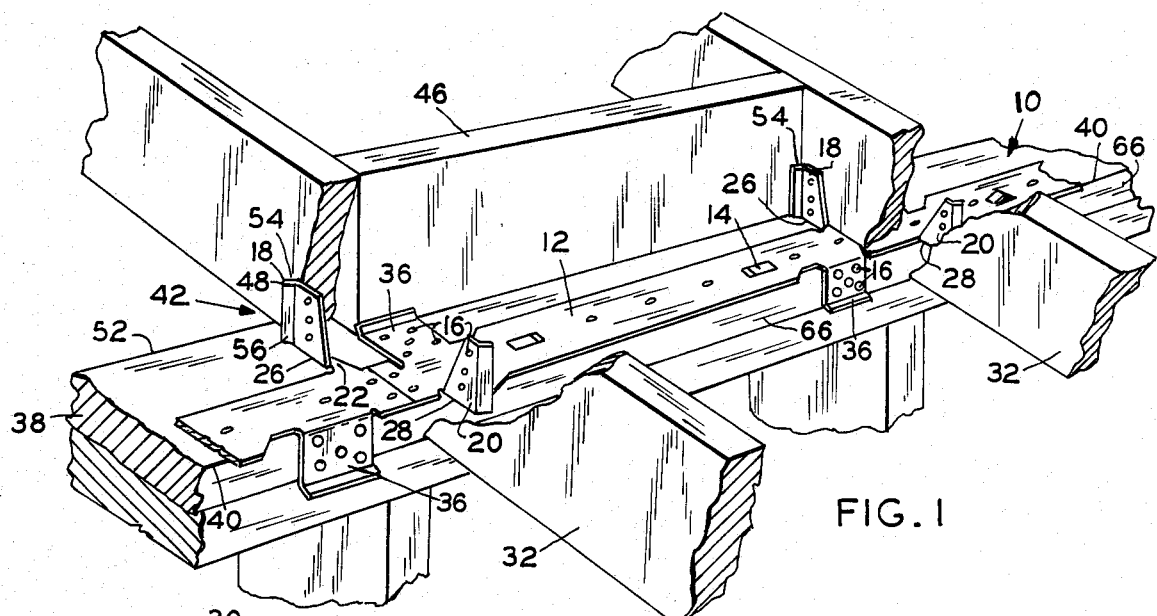
FIG. 1 illustrates in perspective the spacing and support construction member of the instant invention as used on a supporting member with cross-members and blocking.
Figure 2:
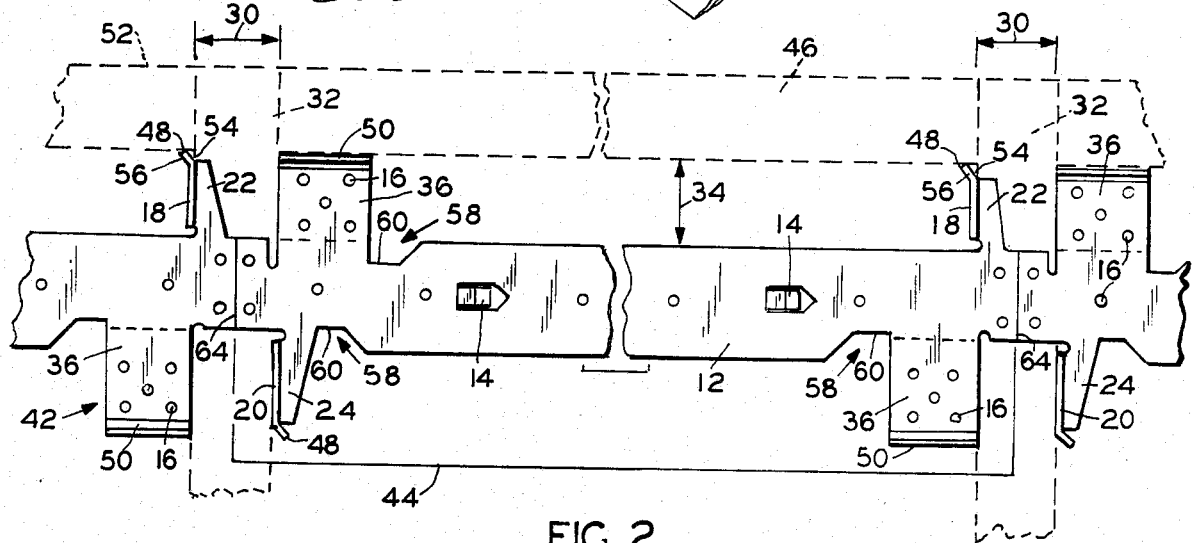
FIG. 2 illustrates a top view of the spacing and support construction member of FIG. 1.
Figure 3:
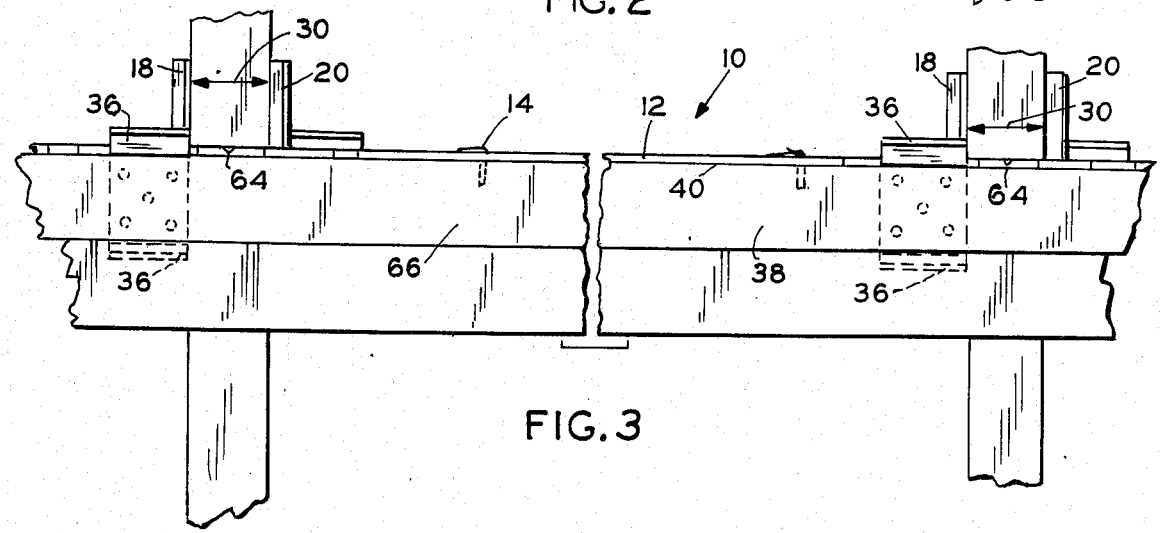
FIG. 3 illustrates a side view of the spacing and support construction member of FIG. 2.

Referring now to the drawings, and more particularly to FIG. 1, FIG. 2, and FIG. 3, there is shown the preferred embodiment of the spacing and support construction member 10 in perspective, top and side views respectively. The spacing and support construction member 10 comprises an elongated center strip 12 of preferably about one (1) inch in width, although other widths may be suitable and even desirable for particular applications, made from steel banding, and having self-nailing prongs 14 and perforations 16 for nailing formed therein Extending from the center strip 12 are multiple pairs of perpendicular projections 18 and 20 at fixed locations along the center strip 12. The perpendicular projections 18 and 20 are formed, respectively, from lateral extensions 22 and 24 from the center strip 12 which are bent perpendicularly to the plane of the center strip 12, the bend-lines 26 and 28 lying transverse to the length of the center strip 12. The perpendicular projections 18 and 20 are located on opposite sides of the center strip 12 and are separated a distance 30. Distance 30 corresponds to the thickness of a cross-member 32, generally a rafter or joist, which is placed between the perpendicular projections 18 and 20 for attachment and support. The placement of the perpendicular projections 18 and 20, as illustrated, on the outside of, and on opposite sides of, the center strip 12, enables the spacing and support member construction 10 to be readily stackable, and thus be more easily stored and handled.

Extending outwards from the center strip 12, in the plane of the center strip 12 and opposing each perpendicular projection 18 and 20 is a nailing tab 36. The nailing tab 36, in the preferred embodiment, is a generally rectangular projection which is utilized to provide additional attachment of the spacing and support construction member 10 to the supporting member 38 and thereby furnish supplemental support to the cross-member 32. As an extension of the center strip 12, the nailing tab 36 can be attached, by nailing through its perforations 16 to the supporting member 38, such as a top plate, in the same manner and plane that the length of the center strip 12 is attached to the supporting member 38. Alternatively, and generally preferably, the nailing tab 36 may be bent, as shown in FIG. 1, as by hammering, over the edge 40 of the supporting member 38 so that the nailing tab 36 becomes perpendicular to the center strip 12 and may be attached to the supporting member 38 in that configuration.

The center strip 12 itself is of convenient length for handling, with a length of either eight (8) or twelve (12) feet being preferred. The center strip 12 has located, along its length, a multiple number of projection sets 42, consisting of a pair of perpendicular projections 18 and 20 with their opposing nailing tabs 36, which projection sets 42 are separated from each other a specified distance 44, corresponding to the desired separation of cross-members 32. The separation distance 44 between projection sets 42 is usually constant, such as 12, 16 or 24 inches center-to-center, as will be appreciated by the person skilled in frame building construction.

The outer edges 48 and 50 of a perpendicular projection 18 or 20 and a nailing tab 36, respectively, which extend from the center strip 12 and are located between a pair of cross-members 32, are designed so as to be aligned at the same distance 34 from the center strip 12. These outer edges 48 and 50 provide a fixed location against which a blocking piece 46 can be positioned firmly and quickly for subsequent nailing to the cross members 32 and the supporting member 38. Thus, as illustrated, the blocking piece 46 is positioned between cross-members 32 and on top of supporting member 38 where it is abutted against outer edge 48 of perpendicular projection 18 and against outer edge 50 of nailing tab 36. When thus positioned, the user can proceed to nail the blocking piece 46 in place, using either manual or powered hammer means. The edges 48 and 50 serve to restrain the blocking piece 46 from moving under the impact of the hammering blows, and thus the blocking piece 46 is kept aligned in the proper position against the edges 48 and 50. This is especially useful in the application of end blocking, as best seen in FIG. 2, the blocking piece 46 remaining aligned vertically with the outside face 52 of the supporting 38 member so as to facilitate subsequent application of siding. The outer edges 48 of the perpendicular projections 18 and 20 and the outer edges 50 of nailing tabs 36, in the preferred embodiment, are angled, as illustrated, so as to provide a more prominent edge against which to place the blocking piece 46 for attachment. A bend angle 54 of 30 degrees from the plane of the projection 18, 20 or of the nailing tab 36, and a bent length 56 of approximately ¼-inch has proved to be satisfactory.

To facilitate such location of the positioning edges 48 and 50, the center strip 12 may be notched on the opposite side of the center strip 12 from the the edges 48 and 50 so as to provide a positioning guide for initial placement of the center strip 12 on the supporting member 38 to achieve the desired blocking piece 46 positions. In the use of such placement notches 58, the base 60 of the notches 58 are aligned even with the edge 40 of the support member 38. Since the positioning edges 48 and 50 are available on both sides of the center strip 12, the placement notches 58 are also found on both sides of the center strip 12.

The center strip 12 is made to be separable, such as by reduction of material thickness so as to separate after multiple flexes, at a separation mid-line 64 between each pair of perpendicular projections 18, 20. Should the overall length of the spacing and support construction member 10 need shortening, the unwanted portions can be broken off and discarded. Similarly, if the effective length of a spacing and support construction member 10 is to be extended, a second spacing and support construction member 10 is abutted against the end of the spacing and support construction member 10 being supplemented, the spacing and support construction member 10 being designed to accept such extension.

As illustrated in FIG. 1, and as noted above, the nailing tab 36, which is, at least initially, coplanar with the center strip 12, may be bent over the edge 40 of the supporting member 38 so that it is perpendicular to the center strip 12 where that nailing tab 36 may be attached by nailing to the side 66 of that supporting member 38. This attachment of the nailing tabs 36 to the supporting member 38 at a right angle to the attachment of the center strip 12 itself on that supporting member 38 provides combined restraint, by perpendicularly oriented nails, for the spacing and support construction member 10 on the supporting member 38. Thus, where the center strip 12 is laid horizontally along a supporting member 38, such as the top plate of a double plate arrangement, the center strip 2 and its attached projections 18, 20 and 36 would be restrained both horizontally and vertically by perpendicular nailings.

In FIG. 4, the cross-member 32 illustrated is a rafter 68 as commonly used to support roofing (not shown). The perpendicular projection 18 of the center strip 12 is nailed perpendicularly into the rafter 68. Thus it can be seen that the center strip 12, with the bent nailing tab 36 and the perpendicular projection 18 form a direct physical support between the supporting member (top plate) 38 and the rafter 68, so as to provide maximum restraint in the vertical direction, preventing separation of the rafter 68 (and the attached roof) from the supporting member 38 and the remainder of the building.

In frame construction, in a run of cross-members 32, the cross-members 32 normally are separated a standard distance 70 apart, such as 12, 16 or 24 inches. Two common exceptions are the distance 72 between the first two cross-members and the distance 73 between the last two cross-members, the distances 72 and 73 characteristically being less than the standard separation. In addition, the design of the spacing and support construction member 10 must differ when used for positioning and attaching the first or starting cross-member 74 and the last or terminal cross-member 76 of a run of cross-members 32, so as to provide not only positioning but also support. Therefore, a starter and terminal segment 78, compatible with the spacing and support construction member 10, has been provided for use at starting and terminal end cross-members 74 and 76.

The preferred embodiment of the starter and terminal segment 78 is illustrated in FIG. 5. In this configuration, the end 80 of the segment center strip 82 is bent at a right angle 84 to form an end perpendicular projection 86, which, in combination with the perpendicular projection 88 forms the position for the starting cross-member 74 or the terminal cross-member 76 in the run. The starter and terminal segment 78 has the basic characteristics of the spacing and support construction member 10, to include perforations 16 for nailing, a self-nailing prong 14, and nailing tabs 36 for additional attachment and for the positioning of blocking pieces 46. FIG. 6 illustrates a plan view of the starter and terminal segment 78.

As noted above, the center-to-center distance 72 between the first two cross-members 32 at the beginning of a run of cross-members 32 is commonly less than the standard separation distance 70 between cross-members 32 the distance 72 generally being ¾-inch less where cross-members 32 of 1½-inch thickness are used (e.g. 11¼, 15¼, or 23¼ inches) so as to allow standard sheets of flooring 92 (4-ft. by 8-ft.) to completely cover the thickness of the first or starting cross-member 74 rather than extend only to its center. Thus the preferred center-to-center length 90 of the starter and terminal segment, when used as a starter segment, is ¾-inch less than the standard separation distance 70 for cross members 32 used in that particular construction.

When used as a terminal segment, a similar center-to-center length 72 (e.g. 11¼, 15¼, or 23¼ inches) would be used when possible so as to allow the sheeting or flooring 92 to cover completely the terminal cross-member 76. However, in many instances, this will not be possible since the design of the construction may dictate that the length of the supporting members 38, and thus the length of the run of cross-members 32, may not be such to evenly accomodate the standard size of sheeting or flooring 92. The segment center strip 82 of the starter and terminal segment 78 therefore includes a plurality of breaklines 94, that is, lines across the segment center strip 82 where the metal is thinner, and thus can readily be separated, as by multiple bendings. Thus, where necessary, the starter and terminal segment 78 having the pair of perpendicular projections 86 and 88 for attachment to the terminal cross-member 76 may be shortened by breaking out an undesired portion 96 from between the breaklines 94, and discarding it.

The spacing and support construction member 10 is designed for use in frame construction where multiple cross members 32, such as joists or rafters, in parallel alignment, are used to support flooring or roofing.

As illustrated in the drawings, the spacing and support construction member 10 is laid longitudinally along a supporting member 38, such as a top plate in a double plate construction. The preferred manner of use would employ a starter and terminal segment 78 laid so as to encompass the starting cross-member 74 and abutted beneath the second cross member 98 to a spacing and support construction member 10, or perhaps several spacing and support members 10 laid end-to-end where the length of the supporting member 38 exceeds the length of a single spacing and support member construction member 10. At the end of the run of cross-members 32, an additional starter and terminal segment 78 would be used as the the terminal piece to encompass the terminal cross member 76. A similar set of starter and terminal segments 78 and spacing and support construction member(s) 10 would be laid along a second supporting member (not shown), the two supporting members serving to support the run of cross-members 32. If dictated by the dimensions or form of the construction, additional supporting members 38, located intermediate the two opposing supporting members 38, could also be used, with their complement of spacing and support construction members 10 and starter and terminal segments 78.

The spacing and support construction members 10 and the starter and terminal segments 78 are attached to the supporting members 38, by nails through the perforations 16 in the center strip 12 and segment center strips 82, and in the nailing tabs 36, and by the self-nailing prongs 14 of the center strips 12 and 82. If is is desirable to provide supplemental vertical restraint to the cross-members 32, the center strips 12 and 82 may be laid initially so that the nailing tabs 36 on one side of the center strips 12 and 82 extend past the edge 40 of the supporting member 38, the nailing tabs 36 then being hammered about that edge 40 until they lay against the side 66 of the supporting member 38 where the now-bent nailing tabs 36 are nailed, through the perforations 16 found therein, to the side 66 of the supporting member 38.

If, in the construction, it is desired to utilize the positioning outer edges 48 and 50 to simplify the installation of blocking pieces 46, and especially where such blocking pieces 46 are to be flush with the exterior side 52 of the supporting member 38, the placement notches 58 would be utilized to pre-set the correct location of the positioning edges 48 and 50 for use.

As a result of the laying of the spacing and support construction members 10 and the starting and terminal segments 78 on the supporting members 38, a series of pairs of perpendicular projections 18 and 20, 86 and 88, have been established along the length of the supporting members 38, wherein the cross-members 32 can be directly laid within and between corresponding pairs of perpendicular projections 18 and 20, 86 and 88 for support. Each cross-member 32 is thus precisely located across two or more supporting members 38 in a fixed position awaiting permanent attachment, as by nailing through the perforations 16 formed in the perpendicular projections 18, 20, 86, and 88. Following attachment of the cross-members 32 to supporting members 38, the blocking pieces 46 are installed using the provided positioning edges 48 and 50.

As illustrated in the various figures, the instant invention can be used for positioning and support with various forms of cross-members, most commonly joists and rafters, in various dimensional configurations. Along with the described starter and terminal segments 78, the spacing and support member 10 provides, in a single construction member, the capability for precise location, without measuring, for attachment of cross-members 32, continuous interconnecting support between cross-members 32 the availability of supplemental attachment and support at right angles by the bending and attachment of nailing tabs 36, such application being particularly beneficial in the the installation of rafters to provide necessary additional vertical support for the rafters and attached roofing; and, additionally, as a part of the installed construction member invention, preformed positioning edges 48 and 50 for blocking pieces 46 which allow simplified installation of such blocking pieces.

It is thought that the spacing and support construction member 10, with its compatible starter and terminal segment 78, of the present invention and its many attendant advantages will be understood from the foregoing description and that it will be apparent that various changes in form, construction and arrangement of the parts thereof may be made without departing from the spirit and scope of the invention or sacrificing all of its material advantages, the form hereinbefore described being merely an exemplary embodiment thereof.

I claim:

1. A spacing and support construction member for use both in the attachment of multiple cross-members, such as joists and rafters, onto supporting members, such as top plates, and in the attachment of between-cross-member blocking pieces, the said spacing and support construction member comprising:
   a center strip;
   means for attachment of said center strip longitudinally along said supporting member, which means include perforations formed in said center strip for nailing;

a plurality of pairs of projections, which projections of each said pair extend perpendicularly from the said center strip and parallel to each other, and are oriented transverse to the said center strip so as to form, along with the included portion of the elongated center strip, a channel-like framework into which a said cross-member may be positioned for attachment, the said projections of each said pair of projections being spaced one from another so as to correspond to the thickness of the said cross-member;

means for attachment of said perpendicular projection to said cross-members which means include perforations formed in said perpendicular projections for nailing;

the said pairs of projections being precisely located along the length of the said center strip at the position where said cross-members are be attached to said supporting member;

nailing tabs formed and extending outward from the sides in the plane of of the said elongated center strip, the said nailing tabs providing additional mean for attachment of the said elongated strip to the said supporting member;

the said nailing tabs being formed so as to be readily bendable at a right angle about a longitudinal edge of the said supporting member so as to permit the said additional means of attachment by the said nailing tab to be oriented at a right angle to the said means of attachment of the said center strip to the said supporting member;

wherein, in the attachment of said cross-members to said supporting members and particularly in the attachment of rafters to a top plate, where the said center strip is laid horizontally along the said top plate, the said nailing tab can be bent over the said longitudinal edge of said supporting member and attached in such bent position so as to provide both horizontal and vertical attachment of the said spacing and support construction member to the said supporting member and vertical attachment of the said spacing and support construction member to the said cross-member, thus providing direct vertical-to-vertical attachment through the said spacing and support construction member between the said rafters and the said top plate, thereby supplying additional means for vertically holding the rafters onto the said supporting members;

each said nailing tab having an outer edge at its extremity most distant from and parallel to the said center strip; and each said perpendicular projection having an outer edge at its extremity most distant from and normal to the said center strip; and the said outer edge of said nailing tab and the said outer edge of said perpendicular projection, located on the same side of the center strip and projecting an equal distance from the said center strip, combining to form a pair of blocking stops atop the said supporting member on which the said center strip is attached and between consecutive said cross members, against which said blocking stops a said blocking piece may be quickly and firmly positioned for subsequent attachment by nailing to the said cross-members and the said supporting member.

2. A spacing and support construction member, as recited in claim 1, having, when attached longitudinally along said supporting member, said perpendicular projections which are positioned adjacent to said cross member and said nailing tabs which are positioned adjacent to said supporting member, wherein each said outside edge of the said perpendicular projections is angled away from said adjacent cross-member, and each said outside edge of the said nailing tab is angled away from the adjacent said supporting member, so that the said outside edges project into the space enclosed by the said cross-members and the said supporting member to provide a more prominent blocking stop for the said blocking piece to be positioned against.

3. A spacing and support construction member, as recited in claim 1, wherein placement notches are formed into the said sides of the said center strip, the said placement notches having an inner edge, the alignment of said inner edge of said placement notches with a said longitudinal edge of the said supporting member permitting an immediate visual siting for the location for the said attachment of the said center strip along the said supporting member, so as to place the said blocking stops in the correct position for subsequent use in placement of the said blocking pieces.

4. A spacing and support construction member, as recited in claim 1, wherein the said perpendicular projections of a said pair of projections, are formed on opposite sides of the said center strip.

5. A spacing and support construction member, as recited in claim 1, wherein the said center strip is separable at the midline between each said pair of projections, so as to permit shortening, or lengthening by aligned addition of the said center strip of other said spacing and support construction members, of the effective length of said spacing and support construction member.

6. A spacing and support construction member, as recited in claim 1, where, in addition, a starter and terminal segment is provided, for use as a starting end and a terminal end, which is compatible with the said spacing and support member, the said starter and terminal end segment comprising:

a segment center strip, having a length, a starting end, and a connecting end;

means for attachment of said segment center strip along said supporting member;

a single pair of projections located at the said starting end of the said segment center strip, said projection of said pair extending perpendicularly from the said starting end and being parallel to each other, and being oriented transverse to the said center strip so as to form, along with the included portion of the center strip, a channel-like framework into which a said cross-member may be positioned for attachment, the said projections of the said pair being spaced one from the other so as to correspond to the thickness of the said cross-member;

a single perpendicular projection, located near the said connecting end of said segment center strip, which extends perpendicularly from the said segment center strip and is oriented transverse to the said segment center strip, so as to form, with a similar single perpendicular projection located near an end of the said center strip of the spacing and support construction member, a pair of perpendicular projections, spaced one from the other by the thickness of the said cross-member involved, which will position and support a said cross member for attachment to the said supporting member at that location;

means for attachment of the said starting end pair of projections and the said connecting end projection to said cross-members, which means include perforations formed in said projections for nailing;

a nailing tab formed and extending outward from a side in the plane of the said segment center strip, the said nailing tab providing additional means for attachment of the said elongated strip to the said supporting member;

the said length of said segment center strip being separable at a plurality of locations so as to permit shortening of its effective length when used as a said terminal end.

* * * * *